(12) United States Patent
Lambert et al.

(10) Patent No.: US 11,986,890 B2
(45) Date of Patent: May 21, 2024

(54) CARBIDE TIP HOLE SAW

(71) Applicant: The M.K. Morse Company, Canton, OH (US)

(72) Inventors: Michael Lambert, Malvern, OH (US); Chandra Sekhar Rakurty, Canton, OH (US); Peter Vandervaart, North Canton, OH (US)

(73) Assignee: The M.K. Morse Company, Canton, OH (US)

( * ) Notice: Subject to any disclaimer, the term of this patent is extended or adjusted under 35 U.S.C. 154(b) by 0 days.

(21) Appl. No.: 17/838,849

(22) Filed: Jun. 13, 2022

(65) Prior Publication Data

US 2023/0249266 A1     Aug. 10, 2023

Related U.S. Application Data

(60) Provisional application No. 63/307,296, filed on Feb. 7, 2022.

(51) Int. Cl.
    *B23B 51/04*         (2006.01)

(52) U.S. Cl.
    CPC .......... *B23B 51/04* (2013.01); *B23B 51/0467* (2022.01)

(58) Field of Classification Search
    CPC . B23B 51/04; B23B 51/0426; B23B 51/0466; B23B 51/0467; B23B 2251/285; B23B 2251/287; B23D 61/021; B23D 61/121
See application file for complete search history.

(56) References Cited

U.S. PATENT DOCUMENTS

| | | | | |
|---|---|---|---|---|
| 3,309,756 A | * | 3/1967 | Segal | B23D 61/021 407/58 |
| 5,832,803 A | * | 11/1998 | Hayden, Sr. | B23D 61/121 83/846 |
| 6,158,324 A | * | 12/2000 | Kullmann | B23D 61/021 408/206 |
| 6,520,722 B2 | * | 2/2003 | Hopper | B23D 61/121 83/846 |
| 6,939,092 B2 | * | 9/2005 | Korb | B23B 51/0473 408/206 |

(Continued)

FOREIGN PATENT DOCUMENTS

| | | | | |
|---|---|---|---|---|
| CH | | 446859 A | * 11/1967 | |
| DE | | 10253711 A1 | * 6/2004 | B23D 61/021 |

(Continued)

*Primary Examiner* — Ryan Rufo
(74) *Attorney, Agent, or Firm* — Black McCuskey

(57) ABSTRACT

A hole saw is disclosed herein. The hole saw can include a cylindrical body having inner and outer cylindrical surfaces concentric to each other about a first axis. The body can also extend along the first axis between first and second opposite ends. The hole saw can also include a plurality of teeth each including a tooth body and a carbide tip positioned on the tooth body and forming a tooth face. Each of the tooth faces can define one or more cutting edges. The teeth can be arranged in an alternating pattern including a first tooth in the form of a chisel tooth, a second tooth immediately behind the first tooth and in the form of an offset grind tooth, and a third tooth immediately behind the second tooth and in the form of a triple chip grind tooth.

12 Claims, 5 Drawing Sheets

(56) References Cited

U.S. PATENT DOCUMENTS

| | | | |
|---|---|---|---|
| 7,661,347 B2* | 2/2010 | Nagano | B23D 61/121 83/846 |
| 8,714,059 B2* | 5/2014 | Cranna | B23D 61/021 83/13 |
| 9,162,299 B2* | 10/2015 | Kullmann | B23D 61/121 |
| 10,279,408 B2* | 5/2019 | Rakurty | B23D 61/14 |
| 10,363,620 B2* | 7/2019 | Kullmann | B23D 61/121 |
| 10,821,531 B2* | 11/2020 | Yamashita | B23D 61/127 |
| 11,253,935 B2* | 2/2022 | Nishikawa | B23D 61/04 |
| 2005/0257660 A1* | 11/2005 | Hayden | B23D 61/121 83/846 |
| 2006/0016315 A1* | 1/2006 | Zorich | B23D 61/123 83/835 |
| 2017/0297124 A1* | 10/2017 | Rakurty | B23D 65/00 |

FOREIGN PATENT DOCUMENTS

| | | | | |
|---|---|---|---|---|
| DE | 202005002336 U1 * | 5/2005 | | B23D 61/021 |
| EP | 0054885 A2 * | 6/1982 | | |
| EP | 0610647 A1 * | 8/1994 | | |
| EP | 1586401 A1 * | 10/2005 | | B23D 61/121 |
| EP | 2570216 A1 * | 3/2013 | | B23D 61/021 |
| EP | 3616816 A1 * | 3/2020 | | B23B 51/04 |
| JP | H0724973 B2 * | 3/1995 | | |
| WO | WO-9932251 A1 * | 7/1999 | | B23D 61/121 |
| WO | WO-2022063552 A1 * | 3/2022 | | |

* cited by examiner

CARBIDE TIP HOLE SAW

CROSS-REFERENCE TO RELATED APPLICATIONS

This application claims the benefit of U.S. Provisional Patent Application Ser. No. 63/307,296 for an IMPROVED CARBIDE TIP HOLE SAW, filed on Feb. 7, 2022, which is hereby incorporated by reference in its entirety.

BACKGROUND

1. Field

The subject matter relates generally to cutting tools or implements having a cutting edge. In particular, the subject matter relates to cutting tools or implements, such as a hole saw, having teeth on the cutting edge arranged in a particular set pattern.

2. Description of Related Prior Art

A hole saw is a type of cutting tool or implement used in forming circular holes in various materials, such as wood, metal, drywall, etc. The hole saw typically has a hollow and substantially cylindrical body. The cylindrical body has a pair of concentric side walls and a center axis of rotation. A cutting edge with a blade backer and teeth is located at one end of the cylindrical body. A cap is typically located at the end of the body opposite the cutting edge. The cap may include threads, holes or other structure adapted to allow the hole saw to be drivingly connected to a drill, such as through an arbor or driver.

Teeth of the cutting edge are designed to cut a work piece during rotation of the cutting tool. In use, the circular cutting edge creates a circular hole in a work piece and, in turn, removes a cylindrical slug from the work piece. The teeth may all be contained within cylinders extending from the pair of concentric side walls or have some or all of the teeth extending inwardly, toward the center axis of rotation, the same distance and/or outwardly the same or different distances. Every inwardly extending tooth and the inner side wall can contact and hold the slug in the hole saw and can require a relatively large application of force to remove the slug. Typically, after the hole is cut in the work piece, the slug is retained within the hollow interior of the hole cutter and must be removed prior to cutting another hole. The slug removal process is often difficult and time consuming.

Standard hole saws may include apertures or slots formed in the side walls of the hole saw body to pry against in order to force the slug from within the hole saw. A slug may still be difficult to extract from within the body of the hole saw even if it is equipped with slug removal apertures or slots. This is because the slug can become tightly wedged in the hole saw due to moisture, chips, removed and displaced material from the cut or other debris that can find their way between the inner side wall of the hole saw and the slug. The teeth that extend inwardly the same distance, if so equipped, may further exacerbate retention of the slug within the hole saw by engaging the outer surface of the slug.

In addition to slug removal, there are several other characteristics for a hole saw blade that manufacturers attempt to control. A variety of approaches are used to achieve the desired hole saw blade characteristics. The approaches include selecting the materials used to manufacture the blade and designing the profiles of the hole saw blade teeth. For example, manufactures may incorporate relatively hard materials, such as carbide, bi-metal, cermet, ceramic, diamond, or the like, into the tips of the hole saw blade teeth. Because such hard materials are relatively expensive, incorporating the material only into the blade tip allows manufactures to achieve the desired characteristics of the hole saw blade, while minimizing cost of blade production.

In order to incorporate the selected hard material into the tooth tip, a pellet of the selected hard material is first welded to an apex of each blade tooth. Once the pellet of the selected material is welded to the tooth apex, blade manufactures grind the tooth tip. The welded material on the tooth tip typically has a width that is slightly greater than the width of the tooth and blade. The sides of the tip are typically then ground to a tip width that is essentially the same as width or thickness of the tooth and blade backer.

Blade kerf is the overall width of the cut on a workpiece as the saw blade advances through the workpiece. Generally, it is desirable to have a kerf that is relatively wider than the thickness of the tooth and blade backer while cutting certain materials. In order to increase the kerf width, blade manufacturers transversely or laterally position portions of the teeth, including their tips, to locations outside of the thickness or path of travel of the blade backer by a process known as mechanical setting.

The rake angle is the angle that is formed between the tooth face and a line perpendicular to the cutting direction of the blade. A positive rake angle is less than 90 degrees in relation to that perpendicular line and a negative rake angle is more than 90 degrees in relation to that line. The variation in rake angle is a function of the amount of material to be removed, which is a function of tooth spacing and tooth height. Just like the blade kerf, the rake angle is typically mechanically set.

To increase blade kerf and set the rake face angle by mechanical setting, the orientation of the teeth relative to the blade backer are mechanically repositioned by applying a force on either side of each individual tooth. The force plastically deforms the tooth so that the tooth tip is transversely or laterally offset relative to the longitudinal extent of the blade backer or the direction of cutting action travel on the side opposite to the impact. Based on the blade characteristics desired, the individual teeth can be offset to the either side of the blade backer, toward the center axis of rotation or away from the center axis of rotation, with a repeating and/or alternating pattern.

It is desirable to try to control the overall tooth offset of a given blade to ensure that the kerf is precise and uniform over the entire length of the blade. While mechanical setting allows blade manufactures to increase blade kerf, the distance that the teeth are offset from the blade backer as a result of the impact force may not be as controlled as may be desired for a quality cut finish and for even wear of the teeth. There are also physical and manufacturing limits as to how far the teeth can be offset. Furthermore, mechanically setting the blade teeth adds an additional processes step to the manufacturing process, which in turn increases blade manufacturing costs, production scheduling and lead time.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In summary, a hole saw is disclosed herein. The hole saw can include a substantially cylindrical body having an inner substantially cylindrical surface and an outer substantially cylindrical surface extending substantially concentric to each other about a first axis. The substantially cylindrical body can also extend along the first axis between first and second ends opposite to one another. The hole saw can also include a plurality of teeth positioned at the first end of the substantially cylindrical body. Each of the plurality of teeth can include a tooth body having a tooth body width defined along a second axis that is normal to the first axis between an inner lateral tooth body edge and an outer lateral tooth body edge. Each of the plurality of teeth can also include a carbide tip positioned on the tooth body and forming a tooth face. Each tooth face can have a face width defined along a third axis that is normal to the first axis and a face height defined along a fourth axis that is parallel to and spaced from the first axis. Each of the tooth faces of the plurality of teeth can define one or more cutting edges. The plurality of teeth can be arranged in an alternating pattern including a first tooth in the form of a chisel tooth, a second tooth immediately behind the first tooth and in the form of an offset grind tooth, and a third tooth immediately behind the second tooth and in the form of a triple chip grind tooth.

BRIEF DESCRIPTION OF THE DRAWINGS

The detailed description set forth below references the following drawings.

DETAILED DESCRIPTION

The present disclosure, as demonstrated by the exemplary embodiment described below, can provide reduces raw material cost and fabrication time for holes saws. In addition, it has been found a hole saw formed as disclosed herein yields improved cutting performance in abrasive materials and generally provides improved versatility for use in a broader range of cutting applications. Further, use of the tooth geometries disclosed herein prolongs the useful life of the hole saw in demanding abrasive applications.

Figure 1:
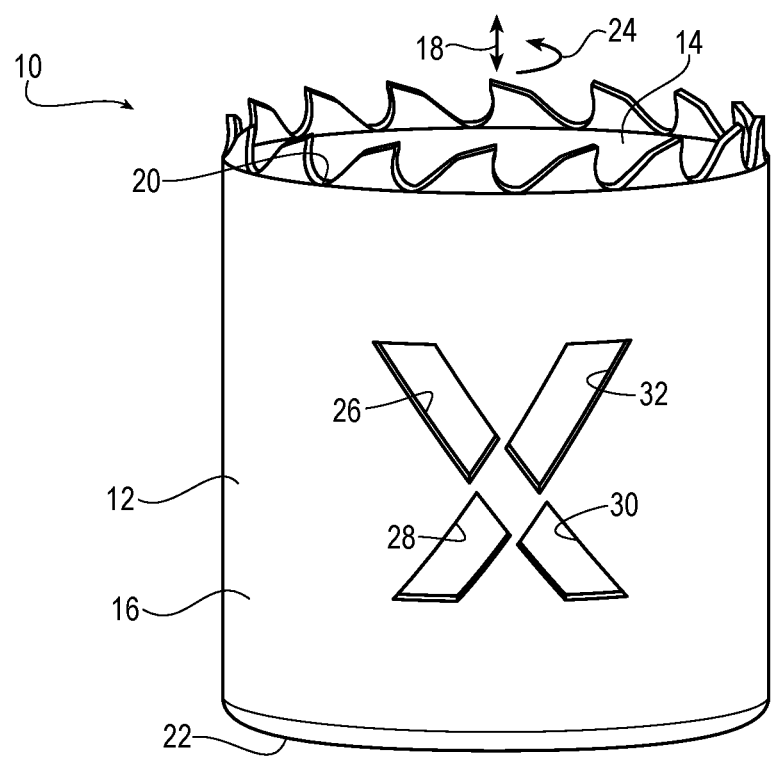
FIG. 1 is an isometric view of a hole saw according to an exemplary embodiment of the present disclosure.
Figure 2:
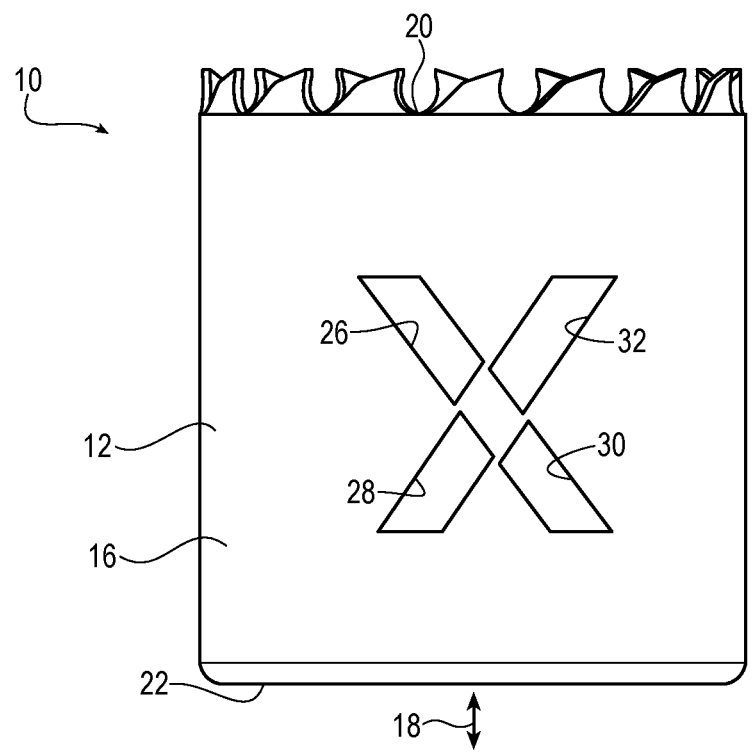
FIG. 2 is a side view of the exemplary hole saw shown in FIG. 1.
Figure 3:
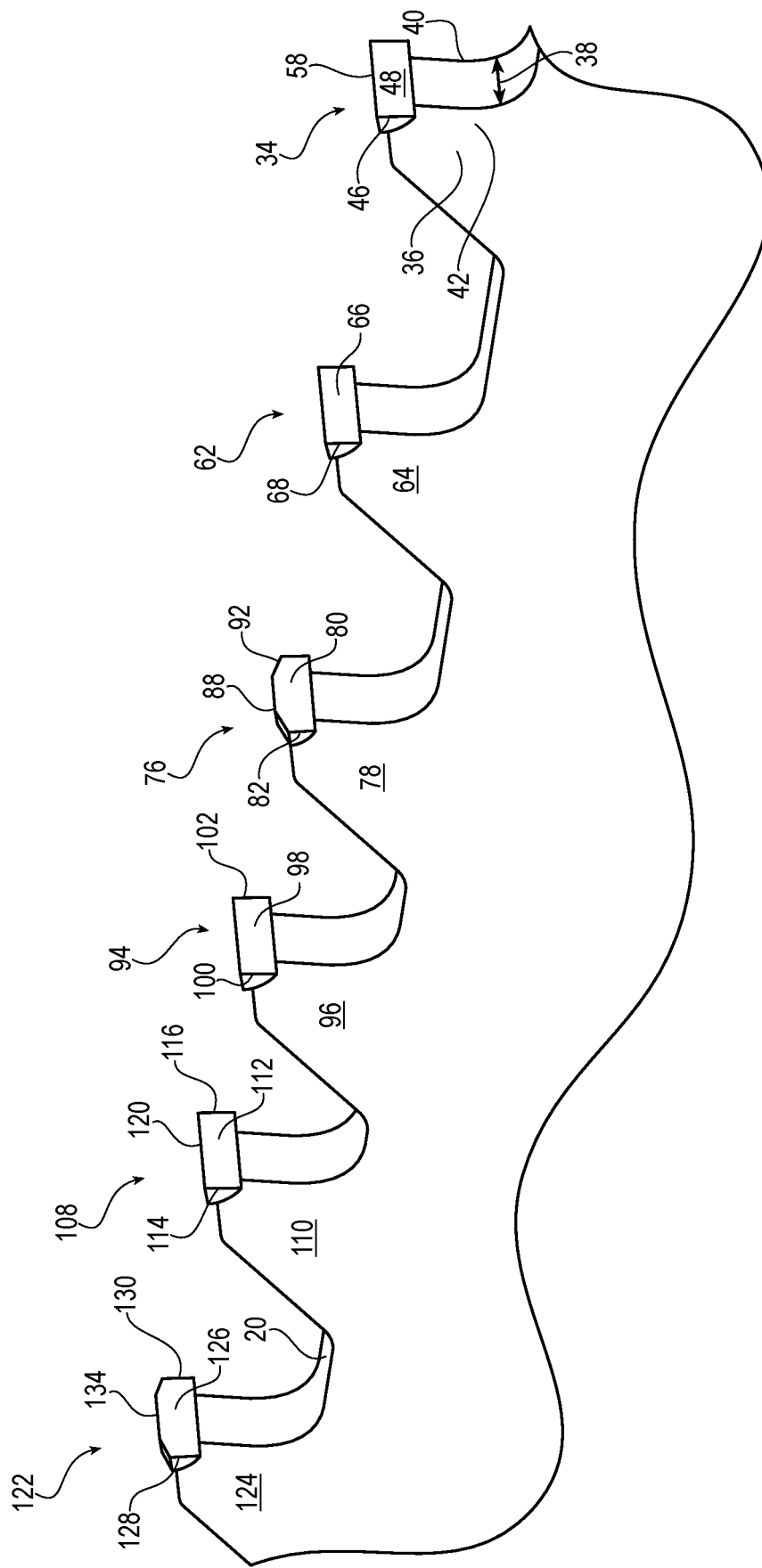
FIG. 3 is a first isometric view of a portion of the exemplary hole saw wherein a substantially cylindrical body of the hole saw has been unwound or flattened to better show geometries of teeth of the exemplary hole saw.
Figure 4:
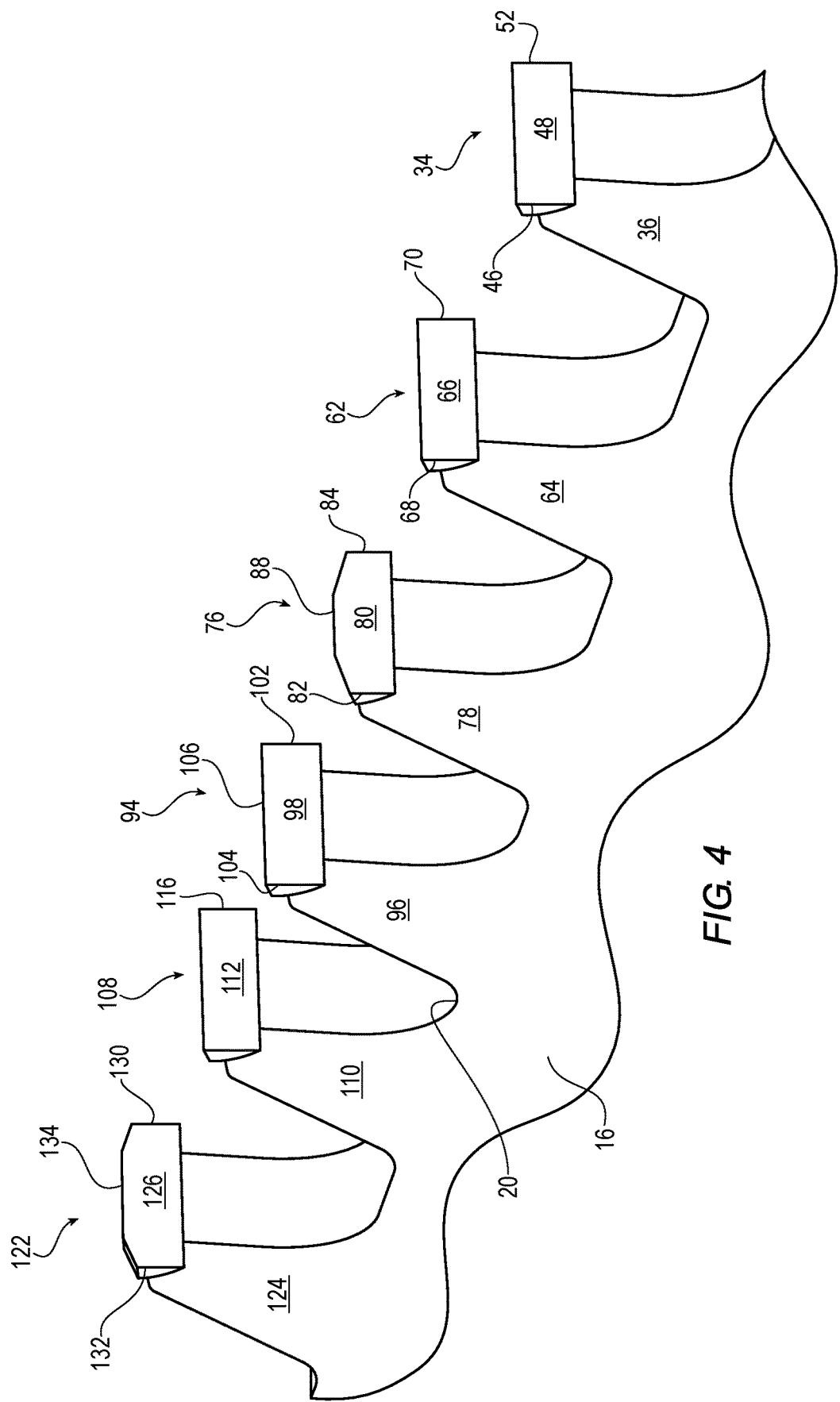
FIG. 4 is a second isometric view of the portion of the exemplary hole saw shown in FIG. 3.
Figure 5:
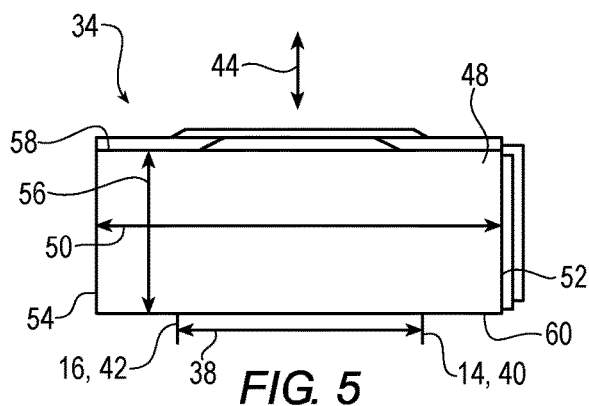
FIG. 5 is a planar, front view of a face of a first tooth (the forward-most tooth) shown in FIGS. 3 and 4.
Figure 8:
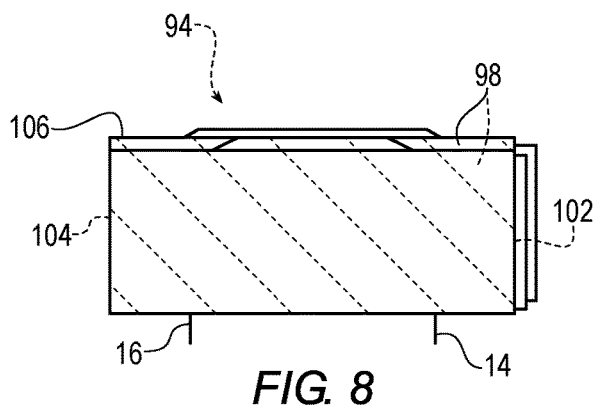
FIG. 8 is a planar, front view similar to FIG. 5 but with the edges of a face of a fourth tooth that is immediately behind the third tooth superimposed over the face of the first tooth to thereby disclose differences in the geometries of the respective faces.
Figure 6:
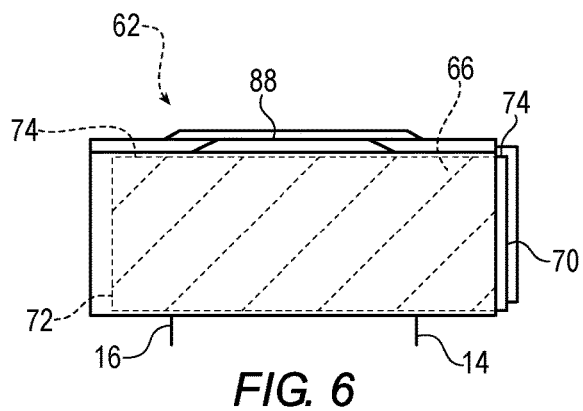
FIG. 6 is a planar, front view similar to FIG. 5 but with the edges of a face of a second tooth that is immediately behind the first tooth superimposed over the face of the first tooth to thereby disclose differences in the geometries of the respective faces.
Figure 9:
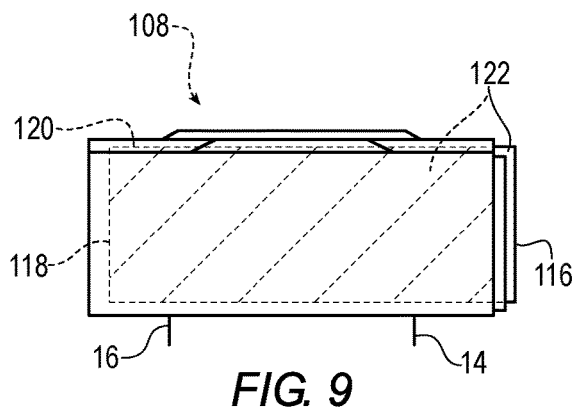
FIG. 9 is a planar, front view similar to FIG. 5 but with the edges of a face of a fifth tooth that is immediately behind the fourth tooth superimposed over the face of the first tooth to thereby disclose differences in the geometries of the respective faces.
Figure 7:
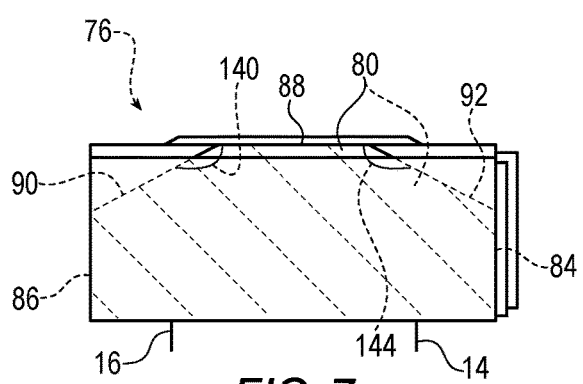
FIG. 7 is a planar, front view similar to FIG. 5 but with the edges of a face of a third tooth that is immediately behind the second tooth superimposed over the face of the first tooth to thereby disclose differences in the geometries of the respective faces.
Figure 10:
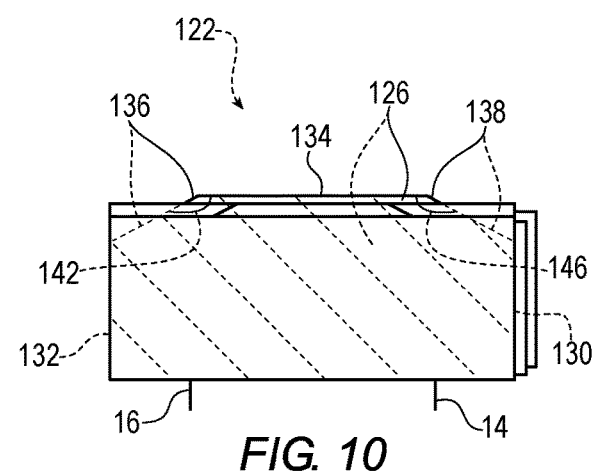
FIG. 10 is a planar, front view similar to FIG. 5 but with the edges of a face of a sixth tooth that is immediately behind the fifth tooth superimposed over the face of the first tooth to thereby disclose differences in the geometries of the respective faces.

FIG. 1 is an isometric view of a hole saw 10 according to an exemplary embodiment of the present disclosure and FIG. 2 is a side view of the exemplary hole saw 10. The exemplary hole saw 10 includes a substantially cylindrical body 12. The exemplary substantially cylindrical body 12 has an inner substantially cylindrical surface 14 and an outer substantially cylindrical surface 16. The exemplary surfaces 14 and 16 extend substantially concentric to each other about a first axis 18. The exemplary axis 18 is a central axis of the body 12. The exemplary substantially cylindrical body 12 extends along said first axis 18 between first and second ends 20, 22 opposite to one another. In operation, the exemplary hole saw 10 can be rotated about exemplary first axis 18 in a direction referenced at 24 (hereafter the cutting direction) to form a hole in a workpiece. Apertures, such as exemplary apertures 26, 28, 30, 32, can be formed in the substantially cylindrical body 12 to allow a tool to be received in the substantially cylindrical body 12 for removing a slug from the hole saw 10.

Referring now to FIGS. 3-10, the exemplary hole saw 10 also includes a plurality of teeth positioned at the first end 20 of the exemplary substantially cylindrical body 12. Each of the plurality of teeth includes a tooth body having a tooth body width defined along a second axis that is normal to the first axis 18 between an inner lateral tooth body edge and an outer lateral tooth body edge. For example, a first tooth 34 includes a first tooth body 36 having a tooth body width 38 defined between an inner lateral tooth body edge 40 and an outer lateral tooth body edge 42. A central axis of the tooth body 36 is referenced at 44. The axis 44 is parallel to and spaced from the first axis 18. It is noted that the view in FIGS. 5-10 is in a plane containing the first axis 18 and the tooth body width 38. In the exemplary embodiment, the tooth body widths of all of the teeth are the same. In the exemplary embodiment, the inner lateral tooth body edge 40 is continuous with the inner substantially cylindrical surface 14 and cylindrical also. In the exemplary embodiment, the outer lateral tooth body edge 42 is continuous with the outer substantially cylindrical surface 16 and cylindrical also.

In the exemplary embodiment, each of the plurality of teeth also include a carbide tip positioned on the respective tooth body. In one or more embodiments of the present disclosure, the carbide tip can be fabricated apart from the tooth body and then welded on the tooth body. For example, the exemplary first tooth 34 includes a carbide tip 46. The exemplary carbide tip 46 forms a tooth face 48 of the first tooth 34.

The exemplary tooth face 48 has a face width defined along a third axis that is normal to the first axis 18. The exemplary third axis is parallel to the second axis described above and the widths of a tooth body and tooth face can be defined in the same plane. The exemplary face width of the first tooth 34 is referenced at 50 in FIG. 5.

The exemplary face width 50 extends between a first inner lateral face edge 52 and a first outer lateral face edge 54. The exemplary first inner lateral face edge 52 is radially closer to the first axis 18 than the inner substantially cylindrical surface 14 of the substantially cylindrical body 12 and thus also closer to the first axis 18 than the inner lateral tooth body edge 40. The exemplary first outer lateral face edge 54 is radially further from the first axis 18 than the outer substantially cylindrical surface 16 of the substantially cylindrical body 12 and thus also further from the first axis 18 than the outer lateral tooth body edge 42.

The exemplary first tooth face 48 is centered laterally on the first tooth body 36. In other words, the exemplary first inner lateral face edge 52 and the exemplary first outer lateral face edge 54 are the same distance from the central axis 44 of the tooth body 36. In one or more embodiments of the present disclosure, the edges 52 and 54 can be spaced laterally from the first tooth body 36 a distance of 0.30-0.50 millimeter.

The exemplary tooth face 48 also has and a face height 56 defined along a fourth axis that is parallel to and spaced from the first axis 18. The exemplary face height 56 of the first tooth 34 extends between a first upper longitudinal face edge 58 and a first lower longitudinal face edge 60. The exemplary first lower longitudinal face edge 60 is closer to the first end 20 of the substantially cylindrical body 12 than to the second end 22. The exemplary first lower longitudinal face edge 60 is closer to the first end 20 than the first upper longitudinal face edge 58.

Each of the tooth faces of the plurality of teeth can define one or more cutting edges. The exemplary first tooth 34 is a chisel tooth and the first upper longitudinal face edge 58 defines a first cutting edge. In one or more embodiments of the present disclosure, the tooth height of the first tooth 34, defined by the first upper longitudinal face edge 58, can be between 51-55 millimeters. The exemplary plurality of teeth are arranged in an alternating and repeating pattern including a second tooth immediately behind the first tooth 34 and in the form of an offset grind tooth, and a third tooth immediately behind the second tooth and in the form of a triple chip grind tooth.

In the exemplary embodiment, the plurality of teeth also includes a second tooth 62. As set forth above, the exemplary second tooth 62 is an offset grind tooth. The exemplary second tooth 62 includes a second tooth body 64 and a second tooth face 66. The exemplary second tooth face 66 is formed by a second carbide tip 68 positioned on the second tooth body 64.

Referring now to FIGS. 1, 2, 5, and 6, the exemplary second tooth face 66 has a second inner lateral face edge 70 that is radially closer to the first axis 18 than the inner substantially cylindrical surface 14 of the substantially cylindrical body 12. The exemplary second inner lateral face edge 70 is also radially closer to the first axis 18 than the first inner lateral face edge 52 of the first tooth 34. It is noted that in FIGS. 6-10 diagonal, dashed lines extend across the face of the respective teeth.

The exemplary second tooth face 66 also has a second outer lateral face edge 72 that is radially further from the first axis 18 than the outer substantially cylindrical surface 16 of the substantially cylindrical body 12. The exemplary second outer lateral face edge 72 is also closer to the first axis 18 than the first outer lateral face edge 54 of the first tooth 34. The exemplary second tooth face 66 can thus be offset laterally relative to the second tooth body 64. In one or more embodiments of the present disclosure, the exemplary second inner lateral face edge 70 can be spaced laterally from the second tooth body 64 a distance of 0.3-0.6 millimeter. In one or more embodiments of the present disclosure, the exemplary second outer lateral face edge 72 can be spaced laterally from the second tooth body 64 a distance of 0.2-0.4 millimeter. The exemplary second tooth face 66 can thus be offset laterally relative to the second tooth body 64. In one or more embodiments of the present disclosure, the center of the exemplary second tooth face 66 can be spaced from the central axis 44 a distance of 0.07-0.2 millimeter.

The exemplary second tooth face 66 also has a second upper longitudinal face edge 74 that defines a second cutting edge. The exemplary second upper longitudinal face edge 74 is positioned closer to the first end 20 of the substantially cylindrical body 12 along the first axis 18 than the first upper longitudinal face edge 58. The exemplary second tooth 62 thus has a lower tooth height than the first tooth 34. In one or more embodiments of the present disclosure, the tooth height of the second tooth 66 can be less than the tooth height of the first tooth 34 an amount of 0.02-0.07 millimeter.

Referring again to FIGS. 3 and 4, in the exemplary embodiment, the plurality of teeth also includes a third tooth 76. As set forth above, the exemplary third tooth 76 is a triple chip grind tooth. The exemplary third tooth 76 includes a third tooth body 78 and a third tooth face 80. The exemplary third tooth face 80 is formed by a third carbide tip 82 positioned on the third tooth body 78.

Referring now to FIGS. 1, 2, 5, and 7, the exemplary third tooth face 80 has a third inner lateral face edge 84 that is radially closer to the first axis 18 than the inner substantially cylindrical surface 14 of the substantially cylindrical body 12 and further from the first axis 18 than the second inner lateral face edge 70 of the second tooth 62. The exemplary third inner lateral face edge 84 is substantially the same distance from the first axis 18 as the exemplary first inner lateral face edge 52.

The exemplary third tooth face 80 also has a third outer lateral face edge 86 that is radially further from the first axis 18 than the outer substantially cylindrical surface 16 of the substantially cylindrical body 12 and also further than the second outer lateral face edge 72. The exemplary third outer lateral face edge 86 is substantially the same radial distance from the first axis 18 as the exemplary first outer lateral face edge 54.

The exemplary third inner lateral face edge 84 and the exemplary third outer lateral face edge 86 are the same distance from the central axis 44 of the third tooth body 78. The exemplary third tooth face 80 is thus centered on the third tooth body 78.

The exemplary third tooth face 80 also has a third upper longitudinal face edge 88 that defines a third cutting edge. The exemplary third tooth face 80 also has a first chamfer face edge 90 extending between the third upper longitudinal face edge 88 and the third outer lateral face edge 86. The exemplary third tooth face 80 also has a second chamfer face edge 92 extending between the third upper longitudinal face edge 88 and the third inner lateral face edge 84. The exemplary third upper longitudinal face edge 88 is positioned further from the first end 20 of the substantially cylindrical body 12 along the first axis 18 than the first upper longitudinal face edge 58 and than the second upper longitudinal face edge 74. The tooth height of the third tooth 76 is thus greater than the tooth height of the first tooth 34. In one or more embodiments of the present disclosure, the tooth height of the third tooth 76, defined by the third upper longitudinal face edge 88, can be greater than the tooth height of the first tooth 34 an amount of 0.005-0.015 millimeter.

In the exemplary embodiment of the present disclosure, the alternating pattern of the plurality of teeth further comprises a fourth tooth immediately behind the third tooth 76 that takes the form of chisel tooth like the first tooth 34, a fifth tooth immediately behind the fourth tooth that takes the form of an offset grind tooth like the second tooth 62, and a sixth tooth immediately behind the fifth tooth that takes the form of triple chip grind tooth like the third tooth 76. However, the geometries of the respective tooth faces are different among the pairs of chisel teeth, offset grind teeth, and triple chip grind teeth.

The exemplary hole saw 10 also includes a second chisel tooth in the exemplary alternatively pattern of teeth in the form of a fourth tooth 94. The exemplary fourth tooth 94 is immediately behind the third tooth 76 in the exemplary alternatively pattern of teeth. The exemplary fourth tooth 94 includes a fourth tooth body 96 and a fourth tooth face 98. The exemplary fourth tooth face 98 is formed by a fourth carbide tip 100 positioned on the fourth tooth body 96.

Referring now to FIGS. 1, 2, 5, and 8, the exemplary fourth tooth face 94 has a fourth inner lateral face edge 102 that is radially closer to the first axis 18 than the inner substantially cylindrical surface 14 of the substantially cylindrical body 12. The exemplary fourth inner lateral face edge 102 is the same distance from the first axis 18 as the exemplary first inner lateral face edge 52 and the exemplary third inner lateral face edge 84.

The exemplary fourth tooth face 94 also has a fourth outer lateral face edge 104 that is radially further from the first axis 18 than the outer substantially cylindrical surface 16 of the substantially cylindrical body 12. The exemplary fourth outer lateral face edge 104 is the same distance from the first axis as the exemplary first outer lateral face edge 54 and the exemplary third outer lateral face edge 86. The exemplary fourth tooth face 94 is thus positioned and centered laterally on the exemplary fourth tooth body 96.

The exemplary fourth tooth face 94 also has a fourth upper longitudinal face edge 106 that defines a fourth cutting edge. The exemplary fourth upper longitudinal face edge 106 is positioned further from the first end 20 of the substantially cylindrical body 12 along the first axis 18 than the exemplary first upper longitudinal face edge 58. The exemplary fourth tooth 94 thus has a tooth height greater than the tooth height of the first tooth 34. The exemplary fourth upper longitudinal face edge 106 is positioned a same distance from the first end 20 of the substantially cylindrical body 12 along the first axis 18 as the exemplary third upper longitudinal face edge 88. The exemplary fourth tooth 94 thus has a tooth height equal to the tooth height of the third tooth 76.

The exemplary hole saw 10 also includes a second offset grind tooth in the exemplary alternatively pattern of teeth in the form of a fifth tooth 108. The exemplary fifth tooth 108 is immediately behind the fourth tooth 94 in the exemplary alternatively pattern of teeth. The exemplary fifth tooth 108 includes a fifth tooth body 110 and a fifth tooth face 112. The exemplary fifth tooth face 112 is formed by a fifth carbide tip 114 positioned on the fifth tooth body 110.

Referring now to FIGS. 1, 2, 5, and 9, the exemplary fifth tooth face 112 is positioned on the fifth tooth body 110 and has a fifth inner lateral face edge 116 that is radially closer to the first axis 18 than the inner substantially cylindrical surface 14 of the substantially cylindrical body 12. The exemplary fifth inner lateral face edge 116 is also radially closer to the first axis 18 than the second inner lateral face edge 70 of the second tooth 62.

The exemplary fifth tooth face 112 also has a fifth outer lateral face edge 118 that is radially further from the first axis 18 than the outer substantially cylindrical surface 16 of the substantially cylindrical body 12. The exemplary fifth outer lateral face edge 118 is closer to the first axis 18 than the first outer lateral face edge 54 of the first tooth 34. The exemplary fifth outer lateral face edge 118 is the same radial distance to the first axis as the second outer lateral face edge 72. The exemplary fifth tooth face 112 is thus offset laterally relative to the fifth tooth body 110.

The exemplary fifth tooth face 112 has a fifth upper longitudinal face edge 120 that defines a fifth cutting edge. The exemplary fifth upper longitudinal face edge 120 is positioned further from the first end 20 of the substantially cylindrical body 12 along the first axis 18 than the first upper longitudinal face edge 58 of the first tooth 34. The exemplary fifth upper longitudinal face edge 120 is also positioned further from the first end 20 of the substantially cylindrical body 12 along the first axis 18 than the second upper longitudinal face edge 74 of the second tooth 62. The exemplary fifth upper longitudinal face edge 120 is also positioned closer to the first end 20 of the substantially cylindrical body 12 along the first axis 18 than the third upper longitudinal face edge 88 of the third tooth 76. The exemplary fifth upper longitudinal face edge 120 is also positioned closer to the first end 20 of the substantially cylindrical body 12 along the first axis 18 than the fourth upper longitudinal face edge 106 of the fourth tooth 94.

The exemplary hole saw 10 also includes a second triple chip grind tooth in the exemplary alternatively pattern of teeth in the form of a sixth tooth 122. The exemplary sixth tooth 122 is immediately behind the fifth tooth 108 in the exemplary alternatively pattern of teeth. The exemplary sixth tooth 122 includes a sixth tooth body 124 and a sixth tooth face 126. The exemplary sixth tooth face 126 is formed by a sixth carbide tip 128 positioned on the sixth tooth body 124.

Referring now to FIGS. 1, 2, 5, and 10, the exemplary sixth tooth face 126 has a sixth inner lateral face edge 130 that is radially closer to the first axis 18 than the inner substantially cylindrical surface 14 of the substantially cylindrical body 12. The exemplary sixth inner lateral face edge 130 is radially further from the first axis 18 than the second inner lateral face edge 70 of the second tooth 62. The exemplary sixth inner lateral face edge 130 is radially further from the first axis 18 than the fifth inner lateral face edge 116 of the fifth tooth 108. The exemplary sixth inner lateral face edge 130, the first inner lateral face edge 52, the third inner lateral face edge 84, and the fourth inner lateral face edge 102 are the same distance from the first axis 18.

The exemplary sixth tooth face 126 has a sixth outer lateral face edge 132 that is radially further from the first axis 18 than the outer substantially cylindrical surface 16 of the substantially cylindrical body 12. The exemplary sixth outer lateral face edge 132 is radially further from the first axis 18 than the second outer lateral face edge 72 of the second tooth 62. The exemplary sixth outer lateral face edge 132, the exemplary first outer lateral face edge 54, and the exemplary third outer lateral face edge 86 are substantially the same distance from the first axis 18.

The exemplary sixth tooth face 126 also has a sixth upper longitudinal face edge 134 that defines a sixth cutting edge. The exemplary sixth tooth face 126 also has a third chamfer face edge 136 extending between the sixth upper longitudinal face edge 134 and the sixth outer lateral face edge 132. The exemplary sixth tooth face 126 also has a fourth chamfer face edge 138 extending between the sixth upper longitudinal face edge 134 and the sixth inner lateral face edge 130.

The exemplary sixth upper longitudinal face edge 134 is positioned further from the first end 20 of the substantially cylindrical body 12 along the first axis 18 than the first upper longitudinal face edge 58 and the second upper longitudinal face edge 74 and the third upper longitudinal face edge 88. The exemplary sixth tooth 122 thus has a tooth height greater than all of the other exemplary teeth.

In the exemplary embodiment, the geometries of the chamfers of the triple chip grind teeth are generally similar. The exemplary third upper longitudinal face edge 88 is shorter than the exemplary sixth upper longitudinal face edge 134, but the chamfers are substantially parallel to one another as shown in FIGS. 5-10. The exemplary first chamfer face edge 90 and the third chamfer face edge 136 are substantially parallel to one another when the first and third faces 80 and 126 are overlaid on one another as show especially in FIGS. 7 and 10. The exemplary second chamfer face edge 92 and the fourth chamfer face edge 138 are substantially parallel to one another when the first and third faces 80 and 126 are overlaid on one another as show especially in FIGS. 6 and 9.

A first angle is defined between the first chamfer face edge 90 and the third upper longitudinal face edge 88. The first angle is referenced at 140 in FIG. 7. A second angle is defined between the third chamfer face edge 136 and the sixth upper longitudinal face edge 134. The second angle is referenced at 142 in FIG. 10. The exemplary first angle 140 and the exemplary second angle 142 are equal to one another.

A third angle is defined between the second chamfer face edge 92 and the third upper longitudinal face edge 88. The third angle is referenced at 144 in FIG. 7. A fourth angle is defined between the fourth chamfer face edge 138 and the sixth upper longitudinal face edge 134. The fourth angle is referenced at 146 in FIG. 10. The exemplary third angle 144 and the exemplary fourth angle equal 146 are equal to one another. The exemplary first angle 140 and the exemplary fourth angle 146 are equal to one another.

Figure 11:
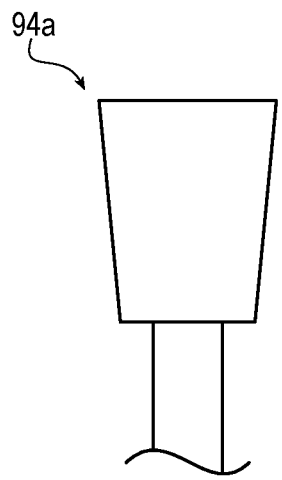
FIG. 11 is a planar, front view of a face and tooth body of another exemplary chisel tooth.
Figure 12:
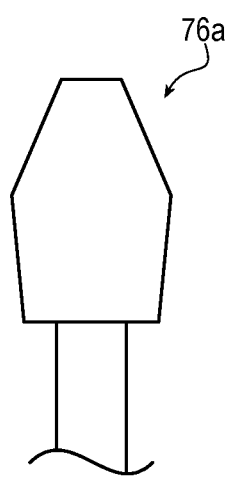
FIG. 12 is a planar, front view of a face and tooth body of another exemplary triple chip tooth.
Figure 13:
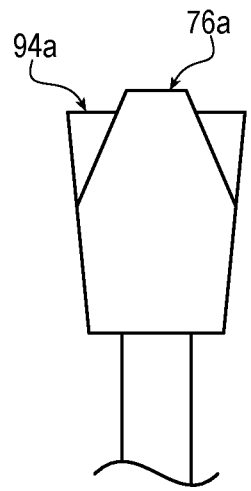
FIG. 13 is a planar, front view of the face and tooth body of the exemplary triple chip tooth shown in FIG. 12 with the exemplary chisel tooth shown in FIG. 11 directly behind (if the hole saw which included the teeth were unwounded or flattened)
Figure 14:
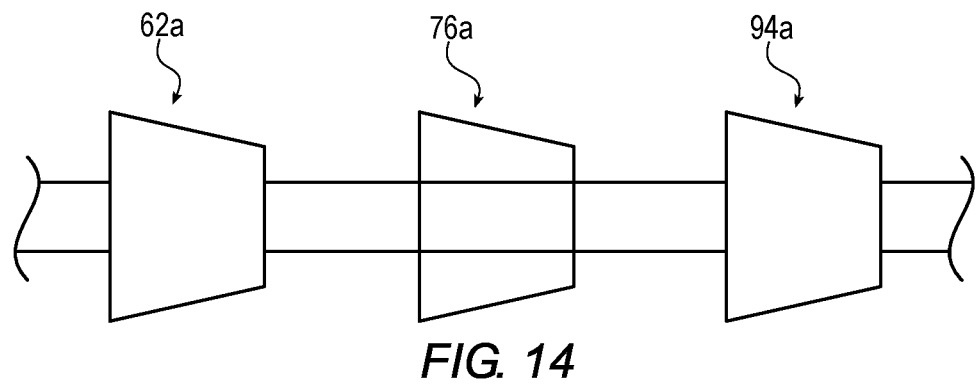
FIG. 14 is a top view of a portion of an exemplary hole saw including the teeth shown in FIGS. 11-13.

FIG. 11 is a planar, front view of a face and tooth body of another exemplary chisel tooth 94a. The exemplary chisel tooth 94a has a face with a trapezoid perimeter with no chamfers. FIG. 12 is a planar, front view of a face and tooth body of another exemplary triple chip tooth 76a. The exemplary triple chip tooth 76a has a face with a generally trapezoid perimeter but with chamfers instead of corners. The triple chip tooth 76a followed by the chisel tooth 94a splits the kerf or chip into three different individual chips. FIG. 13 is a planar, front view of the face and tooth body of the exemplary triple chip tooth shown 76a in FIG. 12 with the exemplary chisel tooth 94a shown in FIG. 11 directly behind, as if the hole saw which included the teeth 76a, 94a were unwound or flattened. FIG. 14 is a top view of a portion of an exemplary hole saw (unwound or flattened) including the teeth 76a, 94a shown in FIGS. 11-13 as well as another offset grind tooth 62a. The exemplary offset grind tooth 62a has a face with a trapezoid perimeter with no chamfers. The exemplary chisel tooth and offset grind tooth thus have faces of the same shape. In the present disclosure, the difference between a chisel tooth and an offset grind tooth is that the face of the chisel tooth is generally centered on the body of the hole saw while the face of the offset grind tooth is shift toward the central axis of the body.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to a particular embodiment disclosed herein as the best mode contemplated for carrying out this present disclosure, but that the present disclosure will be viewed as covering any embodiment falling within the scope of the appended claims. Also, the right to claim a particular sub-feature, sub-component, or sub-element of any disclosed embodiment, singularly or in one or more sub-combinations with any other sub-feature(s), sub-component(s), or sub-element(s), is hereby unconditionally reserved by the Applicant. Also, particular sub-feature(s), sub-component(s), and sub-element(s) of one embodiment that is disclosed herein can replace particular sub-features, sub-components, and sub-elements in another embodiment disclosed herein or can supplement and be added to other embodiments unless otherwise indicated by the drawings or this specification. Further, the use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A hole saw comprising:
   a substantially cylindrical body having an inner substantially cylindrical surface and an outer substantially cylindrical surface extending substantially concentric to each other about a first axis and said substantially cylindrical body extending along said first axis between first and second ends opposite to one another;
   a plurality of teeth positioned at said first end of said substantially cylindrical body, each of said plurality of teeth including:
      a tooth body having a tooth body width defined along a second axis that is normal to said first axis between an inner lateral tooth body edge and an outer lateral tooth body edge, said tooth body having a central axis defining a center between said inner lateral tooth body edge and an outer lateral tooth body edge, and
      a carbide tip positioned on said tooth body and forming a tooth face having a face width defined along a third axis that is normal to said first axis and a face height defined along a fourth axis that is parallel to said first axis, the face width being a greatest width measured between an inner lateral face edge and an outer later face edge, the face height being a greatest distance measured between an upper longitudinal face edge and a lower longitudinal face edge, each tooth face defining one or more cutting edges;

wherein said plurality of teeth are arranged in an alternating pattern including;
    a first tooth in the form of a chisel tooth, said upper longitudinal face edge of said chisel tooth extending substantially perpendicular to the first axis from said inner lateral face edge to said outer lateral face edge, wherein said tooth face of said first tooth is centered laterally on said body of said first tooth relative to the central axis,
    a second tooth next behind said first tooth in a circumferential direction opposite a rotation direction of said hole saw about said first axis and in the form of an offset grind tooth where a center of said tooth face of said second tooth is offset laterally relative to said central axis of said body of said second tooth such that the inner lateral face edge of said second tooth is closer to the first axis than the inner lateral face edge of the first tooth and said outer lateral face edge of said second tooth is closer to said first axis than said outer lateral face edge of said first tooth,
    a third tooth next behind said second tooth in the circumferential direction opposite the rotation direction of said hole saw about said first axis and in the form of a triple chip grind tooth,
    a fourth tooth next behind said third tooth in the circumferential direction opposite the rotation direction of said hole saw and in the form of an additional chisel tooth, said upper longitudinal face edge of said additional chisel tooth extending substantially perpendicular to the first axis from said inner lateral face edge to said outer lateral face edge,
    a fifth tooth next behind said fourth tooth in the circumferential direction opposite the rotation direction of said hole saw and in the form of an additional offset grind tooth where a center of said tooth face of said fifth tooth is offset laterally relative to said central axis of said body of said fifth tooth such that the inner lateral face edge of said fifth tooth is closer to the first axis than the inner lateral face edge of the second tooth, and said outer lateral face edge of said fifth tooth is closer to said first axis than said outer lateral face edge of said first tooth,
    a sixth tooth next behind said fifth tooth in the circumferential direction opposite the rotation direction of said hole saw and in the form of an additional triple chip grind tooth;
wherein said second tooth and said fifth tooth are offset in a same radial direction, and any offset grind tooth on the hole saw is offset in said same radial direction;
wherein said first tooth, said third tooth and said fourth tooth have equal face widths; and
wherein said first tooth defines a first tooth height and said second tooth defines a second tooth height and said third tooth defines a third tooth height and said fourth tooth defines a fourth tooth height, wherein both said first tooth height and said third tooth height are greater than said second tooth height such that said upper longitudinal face edge of the second tooth is closer to said first end of said substantially cylindrical body than said upper longitudinal face edges of said first tooth and said third tooth, respectively, wherein the third tooth height and the fourth tooth height are equal such that said upper longitudinal face edge of the third tooth and said upper longitudinal face edge the fourth tooth are at an equal distance from said first end of said substantially cylindrical body.

2. The hole saw of claim 1, wherein the fourth tooth having a fourth tooth height greater than said first tooth height of said first tooth, the fifth tooth having a fifth tooth height greater than said second tooth height of said second tooth, and the sixth tooth having a sixth tooth height greater than said third tooth height of said third tooth.

3. The hole saw of claim 1, wherein said inner lateral face edge of said first tooth is radially closer to said first axis than said inner substantially cylindrical surface of said substantially cylindrical body, said outer lateral face edge of said first tooth is radially further from said first axis than said outer substantially cylindrical surface of said substantially cylindrical body, and said upper longitudinal face edge of said first tooth defines a first cutting edge.

4. The hole saw of claim 3, wherein said tooth face of said fourth tooth is centered laterally on said body of said fourth tooth, said inner lateral face edge of said fourth tooth is radially closer to said first axis than said inner substantially cylindrical surface of said substantially cylindrical body, said outer lateral face edge of said fourth tooth is radially further from said first axis than said outer substantially cylindrical surface of said substantially cylindrical body, said upper longitudinal face edge of said fourth tooth defines a fourth cutting edge, and said upper longitudinal face edge of said fourth tooth is positioned further from said first end of said substantially cylindrical body along said first axis than said upper longitudinal face edge of said first tooth.

5. The hole saw of claim 4, wherein said inner lateral face edge of said second tooth is radially closer to said first axis than said inner substantially cylindrical surface of said substantially cylindrical body said outer lateral face edge of said second tooth is radially further from said first axis than said outer substantially cylindrical surface of said substantially cylindrical body said upper longitudinal face edge of the second tooth defines a second cutting edge.

6. The hole saw of claim 5, wherein said upper longitudinal face edge of said fifth tooth defines a fifth cutting edge, and said upper longitudinal face edge of said fifth tooth is positioned further from said first end of said substantially cylindrical body along said first axis than said upper longitudinal face edge of said first tooth and said upper longitudinal face edge of said second tooth.

7. The hole saw of claim 5, wherein said tooth face of said third tooth is centered on said body of said third tooth, said inner lateral face edge of said third tooth is radially closer to said first axis than said inner substantially cylindrical surface of said substantially cylindrical body and further from said first axis than said inner lateral face edge of said second tooth, said outer lateral face edge of said third tooth is radially further from said first axis than said outer substantially cylindrical surface of said substantially cylindrical body and said outer lateral face edge of said second tooth and said outer lateral face edge of said third tooth is substantially the same distance to said first axis as said outer lateral face edge of said first tooth, said longitudinal face edge of said third tooth defines a third cutting edge, said tooth face of said third tooth having a first chamfer face edge extending between said upper longitudinal face edge of said third tooth and said outer lateral face edge of said third tooth and a second chamfer face edge extending between said upper longitudinal face edge of said third tooth and said inner lateral face edge of said third tooth, and said upper longitudinal face edge of said third tooth is positioned further from said first end of said substantially cylindrical body along said first axis than said upper longitudinal face edge of said first tooth and said upper longitudinal face edge of said second tooth.

8. The hole saw of claim 7, wherein said tooth face of said sixth tooth is centered on said body of said sixth tooth, said inner lateral face edge of said sixth tooth is radially closer to said first axis than said inner substantially cylindrical surface of said substantially cylindrical body and further from said first axis than said inner lateral face edge of said second tooth, said outer lateral face edge of said sixth tooth is radially further from said first axis than said outer substantially cylindrical surface of said substantially cylindrical body and said outer lateral face edge of said second tooth and said outer lateral face edge of said sixth tooth is substantially the same distance to said first axis as said outer lateral face edge of said third tooth, said upper longitudinal face edge of said sixth tooth defines a sixth cutting edge, said tooth face of said sixth tooth having a third chamfer face edge extending between said upper longitudinal face edge and said outer lateral face edge and a fourth chamfer face edge extending between said upper longitudinal face edge and said inner lateral face edge, and said upper longitudinal face edge of said sixth tooth is positioned further from said first end of said substantially cylindrical body along said first axis than said upper longitudinal face edge of the first tooth and said upper longitudinal face edge of said third tooth.

9. The hole saw of claim 8, wherein:
a first angle is defined between said first chamfer face edge and said upper longitudinal face edge of said third tooth; and
a second angle is defined between said third chamfer face edge and said upper longitudinal face edge of said sixth tooth, said first angle and said second angle are equal to one another.

10. The hole saw of claim 9, wherein:
a third angle is defined between said second chamfer face edge and said upper longitudinal face edge of said third tooth; and
a fourth angle is defined between said fourth chamfer face edge and said upper longitudinal face edge of said sixth tooth, said third angle and said fourth angle are equal to one another.

11. The hole saw of claim 10, wherein said first angle and said fourth angle are equal to one another.

12. The hole saw of claim 11, wherein said upper longitudinal face edge of said third tooth is shorter than said upper longitudinal face edge of said sixth tooth.

* * * * *